(12) United States Patent
Maria Heijnen

(10) Patent No.: US 9,222,330 B2
(45) Date of Patent: Dec. 29, 2015

(54) METHOD FOR SEALING AN ANNULAR SPACE IN A WELLBORE

(75) Inventor: Wilhelmus Hubertus Paulus Maria Heijnen, Stromberg (DE)

(73) Assignee: MAERSK OLIE OG GAS A/S, Copenhagen K (DK)

( * ) Notice: Subject to any disclaimer, the term of this patent is extended or adjusted under 35 U.S.C. 154(b) by 872 days.

(21) Appl. No.: 12/920,777

(22) PCT Filed: Mar. 5, 2009

(86) PCT No.: PCT/EP2009/052613
§ 371 (c)(1),
(2), (4) Date: Nov. 30, 2010

(87) PCT Pub. No.: WO2009/109625
PCT Pub. Date: Sep. 11, 2009

(65) Prior Publication Data
US 2011/0088916 A1    Apr. 21, 2011

Related U.S. Application Data

(60) Provisional application No. 61/034,253, filed on Mar. 6, 2008.

(30) Foreign Application Priority Data

Mar. 6, 2008    (DK) .................................. 2008 00330

(51) Int. Cl.
*E21B 33/10*    (2006.01)
*E21B 33/12*    (2006.01)
(Continued)

(52) U.S. Cl.
CPC . *E21B 33/12* (2013.01); *C09K 8/50* (2013.01); *C09K 8/512* (2013.01); *E21B 33/10* (2013.01); *E21B 33/1208* (2013.01)

(58) Field of Classification Search
None
See application file for complete search history.

(56) References Cited

U.S. PATENT DOCUMENTS 2,631,673 A    3/1953    Halderson et al.
2,769,498 A    11/1956    Huber
(Continued)

FOREIGN PATENT DOCUMENTS

EP    0819830 A2    1/1998
EP    0898050       2/1999
(Continued)

OTHER PUBLICATIONS

Kipp, Dale O., Plastic Material Data Sheets., 2004; 2010, MatWeb, LLC.*
(Continued)

*Primary Examiner* — Jennifer H Gay
*Assistant Examiner* — Caroline Butcher
(74) *Attorney, Agent, or Firm* — Brinks Gilson & Lione

(57) ABSTRACT

A method for providing one or more seals in an annular space between a well tubular and the surrounding formation or between pipes of a wellbore system includes determining an in-situ temperature, pressure, earth formation properties and one or more fluids present at one or more locations where the seals are desired. A sealing substance is placed at the locations and allowed to flow into the annular space and undergo curing to form one or more seals. The sealing substance may be a setting expoxy based, phenolic based or polyester based fluid that includes at least one solid component. The sealing substance has physical and fluid dynamic properties compatible with the determined in-situ parameters.

16 Claims, 2 Drawing Sheets

(51) Int. Cl.
*C09K 8/50* (2006.01)
*C09K 8/512* (2006.01)

(56) References Cited

U.S. PATENT DOCUMENTS

| | | | |
|---|---|---|---|
| 3,379,251 | A | 4/1968 | Bohn |
| 3,727,691 | A | 4/1973 | Muecke et al. |
| 4,064,941 | A | 12/1977 | Smith |
| 4,417,625 | A | 11/1983 | Henson et al. |
| 4,462,714 | A | 7/1984 | Smith |
| 4,739,829 | A | 4/1988 | Brunner |
| 4,913,232 | A | 4/1990 | Cheymol et al. |
| 4,943,610 | A | 7/1990 | Sayles |
| 4,972,906 | A | 11/1990 | McDaniel |
| 5,028,213 | A | 7/1991 | Dickinson et al. |
| 5,240,074 | A | 8/1993 | Peavy et al. |
| 5,404,946 | A | 4/1995 | Hess |
| 5,582,251 | A | 12/1996 | Bailey |
| 6,196,315 | B1 | 3/2001 | Surles et al. |
| 6,616,716 | B2 | 9/2003 | Hansen |
| 6,848,519 | B2* | 2/2005 | Reddy et al. .................. 175/64 |
| 6,955,216 | B1 | 10/2005 | Heijnen |
| 7,306,033 | B2 | 12/2007 | Gorrara |
| 7,458,423 | B2* | 12/2008 | Vercaemer et al. ........ 166/292 |
| 7,523,785 | B2 | 4/2009 | Brink et al. |
| 2001/0027868 | A1 | 10/2001 | Carisella |
| 2006/0027371 | A1 | 2/2006 | Gorrara |
| 2006/0102336 | A1 | 5/2006 | Campbell |
| 2006/0144593 | A1 | 7/2006 | Reddy |
| 2006/0185855 | A1 | 8/2006 | Jordan |
| 2006/0234871 | A1* | 10/2006 | Dalrymple et al. ........... 507/211 |
| 2007/0114016 | A1 | 5/2007 | Brezinski |
| 2007/0209797 | A1* | 9/2007 | Brink et al. .................. 166/297 |

FOREIGN PATENT DOCUMENTS

| | | |
|---|---|---|
| EP | 1 223 303 A1 | 7/2002 |
| EP | 1653042 A1 | 3/2006 |
| EP | 1653043 A1 | 3/2006 |
| GB | 2153409 A | 8/1985 |
| GB | 2300015 A | 4/1996 |
| WO | WO 2005/078235 | 8/2005 |
| WO | WO 2006/008490 | 1/2006 |
| WO | 2006079659 A1 | 8/2006 |
| WO | WO 2006/084597 A1 | 8/2006 |
| WO | WO 2007/022834 A1 | 3/2007 |
| WO | WO 2007/101444 | 9/2007 |
| WO | WO 2007/124041 | 11/2007 |

OTHER PUBLICATIONS

International Search Report and Written Opinion of the International Searching Authority for corresponding PCT application No. EP2009/052613, mailing date of Jul. 16, 2010.

International Search Report and Written Opinion for PCT/EP2009/052871.

International Search Report for PCT/EP2009/52554, mailed Jun. 8, 2009.

Written Opinion for PCT/EP2009/52554, mailed Jun. 8, 2009.

International Preliminary Report on Patentability for PCT/EP2009/52554, mailed May 25, 2010.

\* cited by examiner

METHOD FOR SEALING AN ANNULAR SPACE IN A WELLBORE

RELATED APPLICATIONS

This application claims the benefit under 35 U.S.C. §371 of International Application No. PCT/EP2009/052613, filed Mar. 5, 2009, which claims priority to U.S. Provisional Application No. 61/034,253, filed Mar. 6, 2008 and Danish Application No. PA 2008 00330, filed Mar. 6, 2008, the contents of all of which are incorporated herein by reference in their entirety.

FIELD OF THE INVENTION

The present invention relates to the field of oil recovery from a wellbore.

BACKGROUND OF THE INVENTION

For oil recovery a well is drilled and a well tubular such as a casing or a liner is introduced into the well. The outside diameter of the well tubular is smaller than the inside diameter of the wellbore, thereby forming an annular space between the wall tubular and the wellbore. The well tubular is perforated at one or more zones in order to facilitate the flow of hydrocarbons into the tubular and subsequent flow upstream for recovery. Occasionally contaminating materials such as water and sand are produced along with the hydrocarbons from a part of the subterranean formations surrounding the well tubular. In these situations it is desirable to seal off the well tubular from one or more parts of the annular space. Also in other situation it may be desirable to seal off the annular space.

To seal off a desired part of, e.g., a well one possibility is to isolate the internal part of the well tubular using temporary packers. Cement or another hardenable composition is then pumped down to the isolated zone to seal the perforated openings in the desired part of the well tubular. If production is subsequently desired from a zone situated further downstream in the casing, removal or penetration of the seal is required.

In the past the placing of a "treatment fluid", e.g. an acid, a polymer, or cement, within a wellbore has been accomplished by use of a "bailer" which is introduced into the well on a wireline or the like. The bailer contains a specific volume and is activatable due to density differential of the treatment fluid relative to the natural fluids present in the wellbore at the time and location of treatment. Even modified bailer systems do not satisfactorily deliver a predetermined amount of a treatment fluid at the exact location, especially in highly deviated wells or in the well tubular which has become "corkscrewed". Thus, a number of other systems have been devised for deploying a "treatment fluid" at a proper location for e.g. providing a seal.

U.S. Pat. No. 6,955,216 discloses a device for injecting a fluid into an earth formation surrounding a well. The device comprises a body suitable for being arranged in a well bore and provided with a fluid chamber for storage of suitable sealant and a pair of inflatable packers arranged to isolate a portion of the well bore between the packers upon inflating the packers. The suitable sealant in then injected under pressure into the formation through perforations isolated between the packers. The sealant composition is disclosed to be a suitable material, such as a vulcanised or unvulcanised rubber composition.

U.S. Pat. No. 4,972,906 discloses the use of a mixture of a liquid epoxy material and a hardener for plugging a zone in a subterranean zone. The epoxy material used is heavier than the fluid in the well, and it is further characterized as being free of solids and having a low viscosity at downhole temperature and pressure. The material is placed in a well by the use of a positive displacement bailer. Hence, the liquid epoxy material will exhibit an undesirable axial dispersion which may only partially be overcome by using an excessive amount of the epoxy material. Thus, the method has the drawback of not facilitating a site-specific placing of the seal.

Thus, there is a need to devise improved procedures for introducing a seal in an annular space between a well tubular and the surrounding formation.

SUMMARY OF THE INVENTION

In order to overcome the above-mentioned limitations of the known methods for providing a sealing, the present invention provides a method for providing one or more seals in an annular space between a well tubular and the surrounding formation or between pipes of a wellbore system, said method comprising the steps of
   a) determining the in-situ temperature, pressure, earth formation properties and fluid(s) present at the position(s) where said one or more seals are desired,
   b) providing a sealing substance which is a setting expoxy based, phenolic based or polyester based fluid comprising at least one solid component and said sealing substance having physical and fluid dynamic properties compatible with the in-situ parameters determined in step a),
   c) placing said sealing substance at one or more locations allowing it to flow into the annular space and undergo curing to form said one or more seals.

In one embodiment the sealing substance the sealing substance has thixotropic properties which are compatible with the parameters determined in step a). By using a sealing substance which is thixotropic it has been found that the coherence of such a sealing substance provides for unique properties in relation to dispersion of the fluid, in particular to enable the fluid to flow around the whole diameter of a tubular without slumping or excessive dispersion outwards from said tubular.

The present invention now provides a process for providing one or more seals with great precision and without introducing excessive amounts of sealing substance into said annular space.

Figure 1:
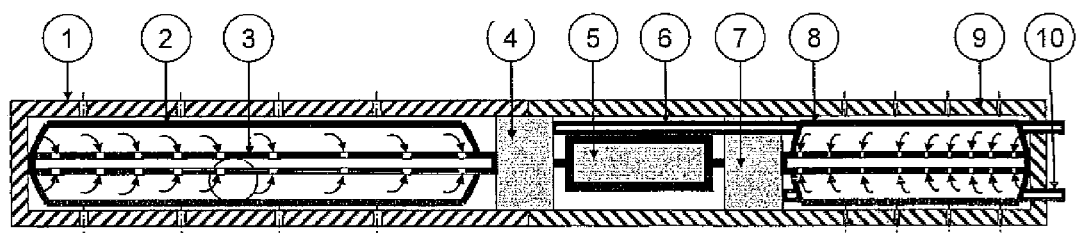
FIG. 1 shows the injection system comprising two deformable cartridges each containing a fluid. In the case of a two component system this will be a base fluid and a hardener. The fluids are being extracted from the cartridges using positive displacement pumps. These pumps are driven by a single motor and each pump has a pre-determined displacement per revolution thus enabling the definition of the mixing relation between the fluids. A similar design can be made for fluid systems consisting of a single or more than two components.
   1: housing with holes allowing wellbore pressure to enter the housing
   2: deformable tube filled with the substance
   3: internal rod with holes allowing the substance to access the pump (4)
   4: pump with internal valve
   5: electric motor driving both pumps (4 and 7)

6: exit line of the pump (4)
7: pump with internal valve
8: deformable tube filled with the substance
9: housing with holes allowing wellbore pressure to enter the housing
10: exit line of the pump (7)

Figure 2:
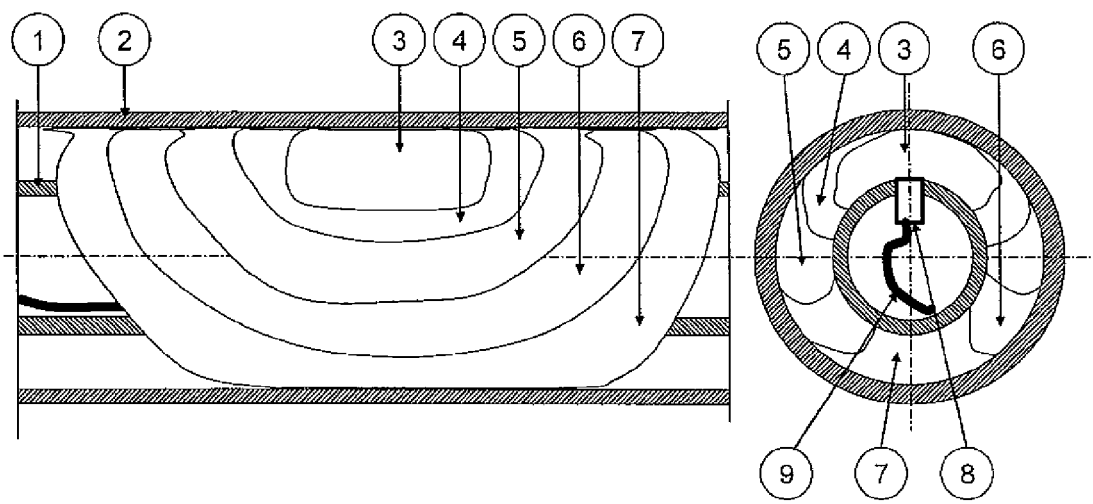

FIG. 2 shows the displacement sequence of the fluids when displaced into the annular space formed by the well bore (2) and well tubular (1). The area's (3), (4), (5), (6) and (7) represent the progression of the fluid during the displacement in steps randomly taken from the video tapes. FIG. 2 shows that the fluid stay's together, i.e. is not slumping nor mixing during the displacement. The time it took to displace 15 liters into an annular space of 1.5 inch is some 10-20 minutes. This time can be varied by using different motor and pump combinations. During the time that the fluid is being displaced into the annular space 'hardening' of the fluid will be prevented by using retarding chemicals.

1: inner tube, representing the liner in the well bore
2: outer tube, representing the well bore wall
3: stage 1 of filling
4: stage 2 of filling
5: stage 3 of filling
6: stage 4 of filling
7: final fill
8: fill nozzle
9: fill tube

DETAILED DESCRIPTION OF THE INVENTION

The present invention provides a method for providing one or more seals in an annular space between a well tubular and the surrounding formation or between pipes of a wellbore system, said method comprising the steps of
 a) determining the in-situ temperature, pressure, earth formation properties and fluid(s) present at the position(s) where said one or more seals are desired,
 b) providing a sealing substance which is a setting expoxy based, phenolic based or polyester based fluid comprising at least one solid component and said sealing substance having physical and fluid dynamic properties compatible with the in-situ parameters determined in step a),
 c) placing said sealing substance at one or more locations allowing it to flow into the annular space and undergo curing to form said one or more seals.

The sealing substance is an epoxy, phenolic or polyester based fluid. Such setting liquids are well known in a wide number of industrial applications and they are commercially available as a vast number of different compositions. For instance, an epoxide containing liquid may be selected from the group of the diglycidyl ether of 1,4-butanediol, the diglycidyl ether of neopentyl glycol, the diglycidyl ether of cyclohexane dimethanol and mixtures thereof. In one embodiment the epoxy is comprised of epichlorohydrin and bisphenol A. It will be appreciated that a mixture of different epoxides may also be used for the sealing substance. Likewise, it will be appreciated by those skilled in the art that a number of phenolic and polyester based fluids may also be used. The sealing substance may comprise an epoxy, phenolic or polyester contents in the range from about 10% to about 95% by weight, or from about 20% to about 80% by weight, or from about 10% to about 75% by weight, or from about 10% to about 50% by weight, or from about 30% to about 80% by weight, or from about 40% to about 80% by weight, or from about 60% to about 75% by weight.

Suitable hardening agent for epoxy is at least one member selected from the group of aliphatic amines, aromatic amines, and carboxylic acid anhydrides. Non-limiting examples of such hardening agents for epoxy based fluids are aliphatic amines, aromatic amines, amide amines, amido amines, imidazoles and carboxylic acid anhydrides. Examples of hardening agents for epoxy fluids are triethylenetetraamine, ethylenediamine, N-cocoalkyltrimethylenediamine, isophoronediamine, diethyltoluenediamine and tris(dimethylaminomethylphenol). These hardening agents may be present in said epoxy fluid in an amount in the range of from about 15% to about 40% by weight of said fluid.

In one embodiment the sealing substance has thixotropic properties which are compatible with the parameters determined in step a). By using a sealing substance which has thixotropic properties it has been found that the coherence of such a sealing substance provides for unique properties in relation to dispersion of the fluid, in particular to enable the fluid to flow around the whole diameter of a tubular without slumping or excessive dispersion outwards from said tubular. The thixotropic properties of an epoxy, phenolic or polyester based fluid may be controlled by various additive, e.g. by addition of silica flakes to increase the thixotropic properties or by addition of acetone to decrease the thixotropic properties. In another embodiment the sealing substance comprises silica flakes. In another embodiment the sealing substance comprises carbon fibres. In another embodiment the density of said sealing substance is in the range from about 700 $kg/m^3$ to about 1400 $kg/m^3$, such as in the range from about 800 $kg/m^3$ to about 1200 $kg/m^3$, in the range from about 900 $kg/m^3$ to about 1100 $kg/m^3$, in the range from about 700 $kg/m^3$ to about 900 $kg/m^3$, in the range from about 900 $kg/m^3$ to about 1200 $kg/m^3$, or in the range from about 1000 $kg/m^3$ to about 1200 $kg/m^3$.

In another embodiment the sealing substance has a density which is substantially the same as the density of the fluid(s) determined in step a). In this case the sealing substance may be introduced into the one or more locations at approximately the same vertical position as the sealing substance is to flow into the annular space.

In yet another embodiment the sealing substance has a density which is lower than the density of the fluid(s) determined in step a). In this case the sealing substance may be introduced into the one or more locations at a lower vertical position than the annular space into which said sealing substance is to flow.

In yet another embodiment the sealing substance has a density which is higher than the density of the fluid(s) determined in step a). In this case the sealing substance may be introduced into the one or more locations at a higher vertical position than the annular space into which said sealing substance is to flow.

In any event the sealing substance is designed for the specific application. Thus, to modulate the density of the sealing substance it may also comprise barite or a light weight polymer. Other ingredients which may be used to adjust the properties of the sealing substance as needed for the specific application are crystalline silicas, amorphous silicas, clays, calcium carbonate and the like.

In another embodiment the time for said sealing substance to undergo curing in step c) is controlled by the addition of a catalyst, such as an accelerator or a retarder. The catalyst such as an accelerator or a retarder may be admixed as part of the sealing substance when this substance is prepared in accordance with the determined parameters under step a). In this case, the curing time must be designed so as to allow the placing of the sealing substance at the location(s) as well as the flow of the sealing substance into the annular space. In another embodiment the sealing substance and the catalyst, such as an accelerator or a retarder, are mixed in-situ using a downhole mixer. This eliminates the need for having substantially no change of the viscoelastic properties of the sealing substance during the transfer of the sealing substance from the surface to its downhole position where injection is to take place. Such downhole mixers are known in the art, see e.g. U.S. Pat. No. 5,582,251.

In another embodiment the sealing substance exhibit low curing shrinkage, such as less than 2% or less than 1%. In another embodiment the sealing substance exhibits no curing shrinkage or exhibit expansion upon curing. One way to reduce curing shrinkage or to invoke expansion upon curing is to use a sealing substance comprising a material which expands upon absorption of water, e.g. wood fibres and the like.

In another embodiment the sealing substance comprises a filler material determining the mechanical properties of the substance after curing.

In another embodiment wherein in said step c) said sealing substance is placed at said one or more location(s) using a system for injection of a substance into an annular space. A system for injection is based on the use of pressure in order to inject the fluid. In another embodiment the placing of the sealing substance at one or more locations are performed by an assembly inserted into said well tubular, said assembly comprising: a cutting part capable of making a hole through said well tubular, a substance chamber for storage of said sealing substance, and an injection part capable of injecting said sealing substance into said annular space. Examples of such assembly's for injection of sealing substances may be found in U.S. application Ser. No. 11/372,490. In another embodiment, in said step c) said sealing substance is placed at said one or more location(s) via a single hole in said well tubular or in said pipes.

In another aspect the present invention provides a method for removal of one or more seals in an annular space between a well tubular and the surrounding formation or between pipes of a wellbore system, which seals have been provided by the method according to the present invention, said method for removal comprising heating said seals to a temperature of at least 250° C., such as about 300° C.

All references, including publications, patent applications, and patents, cited herein are hereby incorporated by reference in their entirety and to the same extent as if each reference were individually and specifically indicated to be incorporated by reference and were set forth in its entirety herein, regardless of any separately provided incorporation of particular documents made elsewhere herein.

The use of the terms "the", "a", "an" and similar referents in the context of describing the invention are to be construed to cover both the singular and the plural, unless otherwise indicated herein or clearly contradicted by context.

Unless otherwise stated, all exact values provided herein are representative of corresponding approximate values (e.g., all exact exemplary values provided with respect to a particular factor or measurement can be considered to also provide a corresponding approximate measurement, modified by "about," where appropriate).

The description herein of any aspect or embodiment of the invention using terms such as "comprising", "having," "including," or "containing" with reference to an element or elements is intended to provide support for a similar aspect or embodiment of the invention that "consists of", "consists essentially of", or "substantially comprises" that particular element or elements, unless otherwise stated or clearly contradicted by context (e.g., a composition described herein as comprising a particular element should be understood as also describing a composition consisting of that element, unless otherwise stated or clearly contradicted by context).

All headings and sub-headings are used herein for convenience only and should not be construed as limiting the invention in any way.

The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

The citation and incorporation of patent documents herein is done for convenience only and does not reflect any view of the validity, patentability, and/or enforceability of such patent documents.

This invention includes all modifications and equivalents of the subject matter recited in the claims and/or aspects appended hereto as permitted by applicable law.

The present invention is further illustrated by the following examples which, however, are not to be construed as limiting the scope of protection. The features disclosed in the foregoing description and in the following examples may, both separately or in any combination thereof, be material for realising the invention in diverse forms thereof.

EXAMPLES

Example 1

Lab experiments have shown that normal epoxy will slump, float and/or disperse in water and oil. The fluid system as described in this document will however behave as shown in FIG. 2 as confirmed by a series of lab experiments performed.

Current Laboratory work will firm up the initial data regarding the fluid composition in such a manner that a performance envelope for the fluid systems is established. This performance envelope will contain but is not limited to:

Pressure, temperature as a function of hardening time per fluid system which contains a mixture of fluids and at least one solid. This solid can consist of a hollow structure (gas filled) therewith reducing the overall density of the fluid.

The invention claimed is:

1. A method for providing one or more seals at a plurality of locations in an annular space between a well tubular and a surrounding formation or between pipes of a wellbore system, said method comprising the steps of
   a) determining an in-situ temperature, pressure, earth formation properties and one or more fluids present at the plurality of positions to thereby determine a density of the one or more fluids present at the plurality of locations,
   b) providing a sealing substance comprising an epoxy, phenolic, or polyester based fluid, at least one solid component, and a hardener for causing the sealing substance to cure,
   configuring said sealing substance to have physical and fluid dynamic properties compatible with the in-situ parameters determined in step a) to thereby facilitate placing the gel at one or more of the plurality of locations where said seals are desired, and
   c) injecting said sealing substance through a plurality of openings formed in said well tubular, wherein said sealing substance is configured to flow into the annular space and then around the exterior surface of the well tubular to thereby fill an entire annular space that extends between an exterior surface of the well tubular to the surrounding formation, without sinking or floating away from a point of injection, and cure to form said one or more seals at the plurality of locations to thereby isolate a first annular region of space between the well bore and the exterior surface that extends along a first longitudinal section of the well tubular from a different annular region of space between the well bore and the exterior surface that extends along a second longitudinal section of the well tubular.

2. The method according to claim 1, wherein in said step c) said sealing substance is placed at said one or more locations using a system for injection of a substance into an annular space.

3. The method according to claim 1, wherein the placing of said sealing substance at one or more locations are performed by an assembly inserted into said well tubular, said assembly comprising: a cutting part capable of making a hole through said well tubular, a substance chamber for storage of said sealing substance, and an injection part capable of injecting said sealing substance into said annular space.

4. The method according to claim 1, wherein said sealing substance has thixotropic properties which are compatible with the parameters determined in step a).

5. The method according to claim 1, wherein said sealing substance comprises silica flakes.

6. The method according to claim 1, wherein said sealing substance comprises carbon fibres.

7. The method according to claim 1, wherein the density of said sealing substance is in a range from about 700 kg/m3 to about 1400 kg/m3.

8. The method according to claim 1, wherein configuring said sealing substance to have physical and fluid dynamic properties compatible with the in-situ parameters determined in step a) comprises configuring the sealing substance to have a density equal to the density of the one or more fluids determined in step a).

9. The method according to claim 1, wherein said sealing substance comprises barite.

10. The method according to claim 1, wherein a time for said sealing substance to undergo curing in step c) is controlled by addition of a catalyst, such as an accelerator or a retarder.

11. The method according to claim 1, wherein said sealing substance exhibits a curing shrinkage of less than 2%.

12. The method according to claim 1, wherein said sealing substance exhibits no curing shrinkage or expansion upon curing.

13. The method according to claim 12, wherein said sealing substance comprises wood fibres.

14. The method according to claim 1, wherein said sealing substance comprises a filler material for determining mechanical properties of the sealing substance after curing.

15. The method according to claim 1, wherein in said step c) said sealing substance is placed at said one or more locations via a single hole in said well tubular or in said pipes.

16. The method according to claim 1 further comprising:
heating said one or more seals to a temperature of at least 250° C. to facilitate removal of said one or more seals.

* * * * *